US009253505B2

(12) United States Patent
Zarom (10) Patent No.: US 9,253,505 B2
(45) Date of Patent: Feb. 2, 2016

(54) SYSTEM AND METHOD FOR IMAGE COMPRESSION

(71) Applicant: Newrow, Inc., New York, NY (US)

(72) Inventor: Rony Zarom, New York, NY (US)

(73) Assignee: NEWROW, INC., New York, NY (US)

( * ) Notice: Subject to any disclaimer, the term of this patent is extended or adjusted under 35 U.S.C. 154(b) by 0 days.

(21) Appl. No.: 14/325,034

(22) Filed: Jul. 7, 2014

(65) Prior Publication Data

US 2014/0321764 A1    Oct. 30, 2014

Related U.S. Application Data

(63) Continuation-in-part of application No. 13/259,877, filed as application No. PCT/US2010/030425 on Apr. 8, 2010, now Pat. No. 8,774,534.

(60) Provisional application No. 61/167,536, filed on Apr. 8, 2009.

(51) Int. Cl.
*G06K 9/36* (2006.01)
*H04N 19/593* (2014.01)
(Continued)

(52) U.S. Cl.
CPC .............. *H04N 19/593* (2014.11); *H04N 19/46* (2014.11); *H04N 19/90* (2014.11)

(58) Field of Classification Search
CPC ................. H04N 19/00945; H04N 19/00545; H04N 7/26643; H04N 7/26276; H04N 7/50; H04N 7/26648; H04N 7/368
See application file for complete search history.

(56) References Cited

U.S. PATENT DOCUMENTS 5,649,030 A * 7/1997 Normile et al. ............... 382/253
5,859,932 A    1/1999 Etoh
(Continued)

FOREIGN PATENT DOCUMENTS

EP    0 831 659    3/1998
EP    1087533    3/2001
(Continued)

OTHER PUBLICATIONS

International Search Report for Internation Application No. PCT/US10/130425 mailed Jun. 2, 2010.
(Continued)

*Primary Examiner* — Amir Alavi
(74) *Attorney, Agent, or Firm* — Pearl Cohen Zedek Latzer Baratz LLP (57) ABSTRACT

A system and method for compressing digital image data. An image may be divided into sub-regions. A maximum number of template codes may be determined for representing each sub-region, each template code uniquely identifying a template pattern in a dictionary. Each of a plurality of the sub-regions may be associated with a plurality of template patterns, each of which individually does not match the sub-region, but which when combined together more closely match the sub-region. A compressed data set may be generated for the image, in which each sub-region is represented by up to the maximum number of template codes uniquely identifying the associated plurality of template patterns. The up to the maximum number of template codes may be transmitted for each sub-region from the compressed data set, wherein the maximum number of template codes is a dynamic parameter adjustable based on the bandwidth available for transmitting.

18 Claims, 6 Drawing Sheets

(51) Int. Cl.
*H04N 19/46* (2014.01)
*H04N 19/90* (2014.01)

(56) References Cited

U.S. PATENT DOCUMENTS

| | | | |
|---|---|---|---|
| 5,867,593 A | 2/1999 | Fukuda et al. | |
| 6,061,473 A * | 5/2000 | Chen et al. | 382/235 |
| 6,912,316 B2 * | 6/2005 | Botchkarev | 382/232 |
| 7,836,396 B2 * | 11/2010 | Becker | 715/242 |
| 7,987,442 B2 * | 7/2011 | Rajski et al. | 716/136 |
| 8,774,534 B2 * | 7/2014 | Zarom | 382/232 |
| 2002/0061065 A1 * | 5/2002 | Moore | 375/240.13 |
| 2003/0058943 A1 * | 3/2003 | Zakhor et al. | 375/240.12 |
| 2004/0042547 A1 | 3/2004 | Coleman | |
| 2004/0240745 A1 | 12/2004 | Sugimoto et al. | |
| 2005/0163389 A1 | 7/2005 | Ohmi et al. | |
| 2006/0115166 A1 | 6/2006 | Sung et al. | |
| 2006/0210177 A1 | 9/2006 | Murai et al. | |
| 2006/0268164 A1 | 11/2006 | Nakayama | |
| 2008/0159640 A1 | 7/2008 | Liu | |
| 2008/0240226 A1 * | 10/2008 | Okmianski et al. | 375/240 |
| 2012/0020581 A1 * | 1/2012 | Zarom | 382/233 |
| 2014/0321764 A1 * | 10/2014 | Zarom | 382/243 |

FOREIGN PATENT DOCUMENTS

| | | |
|---|---|---|
| EP | 1499106 | 1/2005 |
| JP | H06-21828 | 1/1994 |
| JP | H07121656 | 5/1995 |
| JP | H07-288474 | 10/1995 |
| JP | 2000-022961 | 1/2000 |
| JP | 2002-369201 | 12/2002 |
| RU | 2107408 C1 | 3/1998 |
| WO | WO 2005/015501 | 2/2005 |
| WO | WO 2009/014156 | 1/2009 |

OTHER PUBLICATIONS

Alameideen et al., "Frequent Pattern Compression: A Significance-Based Compression Scheme for I2 Caches," Technical Report 1500 [online J, Apr. 2004], Computer Sciences Dept.. U. of Wisconsin-Madison. pp. 1-13. Retrieved from the Internet: <URL:http://pages. cs.wisc.edu/alaaipapersltr1500_frequenCpattem_compression. pdf>.

Alzina et al., "2D-Pattem matching Image and Video Compression," Data Compression Conference [online J, Mar. 1999], pp. 424 453. Retrieved from the Internet: <URL:http://citeseerx.ist.psu.edu/ viewdocldownload?dol=10.1.1.52.6598&rep=rep1&type=pdf>.

Howard, "Text Image Compression Using Soft Pattern Matching," The Computer Journal [online], 1997, vol. 40, No. 213, pp. 146-156. Retrieved from the Internet: <URL:http://comjnl.oxfordjoum als. orglcgilcontenVabstracV40/2_and_3/146>.

European Search Report for European Patent Application No. 10 762 454, dated May 2, 2013.

Paul G Howard et al., "The Emerging JBIG2 Standard", IEEE Transactions on Circuits and Systems for Video Technology, IEEE Service Center, Piscataway, NJ, US, vol. 8, No. 7, Nov. 1, 1998.

Osama K Al-Shaykh et al: "Video Compression Using Matching Pursuits", IEEE Transactions on Circuits and Systems for Video Technology, IEEE Service Center, Piscataway, NJ, US, vol. 9, No. 1, Feb. 1, 1999.

Gersho A et al: "Image Coding Using Vector Quantization", International Conference on Acoustics, Speech & Signal Processing. ICASSP. Paris, May 3-5, 1982; [International Conference on Acoustics, Speech & Signal Processing. ICASSP], New York, IEEE, US, vol. 1, May 3, 1982, pp. 428-431.

Office Action for Russian Application No. 2011140866, mailed Apr. 15, 2014.

Office Action for Japanese Patent Application No. 2012-504873, dated Mar. 11, 2014.

Office Action for Australian Patent Application No. 2010234364, dated Feb. 27, 2014.

Office Action for Singapore Patent Application No. 201107354-1, dated Feb. 4, 2014.

Office Action for Korean Patent Application No. 10-2011-7025402, dated Jul. 4, 2014.

Decision on Grant for Russian Application No. 2011140866/08, mailed Nov. 19, 2014.

Notice of Allowance for Korean Application No. 10-2011-7025402, dated Nov. 20, 2014.

Office Action for Japanese Patent Application No. 2012-504873, dated Feb. 24, 2015.

International Search Report for PCT International Application No. PCT/US15/39376, mailed Oct. 1, 2015.

* cited by examiner

SOURCE

Template T3

Template T2

Template T1

SYSTEM AND METHOD FOR IMAGE COMPRESSION

CROSS-REFERENCE TO RELATED APPLICATIONS

This application is a continuation-in-part of U.S. patent application Ser. No. 13/259,877, filed Sep. 23, 2011, now U.S. Pat. No. 8,774,534 which is a national phase of International Patent Application Ser. No. PCT/US10/30425, which in turn claims the benefit of U.S. Provisional Patent Application Ser. No. 61/167,536 filed Apr. 8, 2009, all of which are incorporated by reference herein in their entirety.

FIELD OF THE INVENTION

The present invention relates to systems and methods for image compression and decompression, and in particular for reducing the amount of data used to represent images.

BACKGROUND OF THE INVENTION

Digital imaging may create digital images, typically from a physical object. A digital image may be created directly from a physical scene by a camera or similar devices. Alternatively, a digital image may be obtained from another image in an analog medium, such as photographs, photographic film or printed paper, and may be converted to a digital medium by a scanner or similar device. Many technical images, such as those acquired with topographic equipment, such as computed tomography (CT) scans, side-looking radar or radio telescopes, are obtained by complex processing of non-image data. Finally, a digital image may also be computed from a geometric model or mathematical formula.

A digital image may include pixels. A pixel may be the smallest piece of information in an image. Pixels are normally arranged in a regular two dimensional grid, and are often represented using dots, squares, or rectangles. Each pixel may have a value that represents a property of a sample of an original image. Increasing the density of pixels or samples typically provides a higher resolution or more accurate representation of the original image. The intensity of each pixel may be variable. In color systems, each pixel may have three or four color components such as red, green, and blue, or cyan, magenta, yellow, and black.

Image resolution may measure the quality of an image. Image resolution may be defined by the pixel dimensions in a digital image. An image that is an integer, N, pixels high by an integer, M, pixels wide may have any resolution less than or equal to N×M pixels (spanning N lines of picture height or N TV lines). Another popular convention defines resolution as the total number of pixels in the image, typically given as a number of megapixels, which may be calculated by multiplying pixel columns by pixel rows (N×M) and dividing by one million. Other conventions define resolution by pixels per length unit or pixels per area unit, such as pixels per inch or per square inch. These calculated pixel resolutions are generally inexact (the true resolutions may be smaller than the calculated resolutions) and may serve as approximations or upper bounds of the true image resolution. Generally, the higher the resolution is, the more details are presented in the picture.

Pixels may be stored in a computer memory as a raster image or raster map, or bitmap: a two-dimensional array of small integer values. These values are often transmitted or stored in a compressed form. Each pixel of a raster image is typically associated with a specific "position" in a two-dimensional (2D) image region and values of one or more image features at that position. Digital images may be classified according to the number and nature of those pixel samples.

Image compression may reduce redundancy of the image data in order to decrease the amount of image information to be stored or transmitted. Image compression may be "lossy" (when the decompressed data is different from the original due to loss of data) or "lossless" (when the decompressed data substantially exactly matches the original data). Lossy data may be used when the lost data is sufficiently small or when the benefit of data reduction outweighs the damages due to data loss. Lossless data compression allows the exact original data to be reconstructed from the compressed data. Lossless compression may be used when it is important for the original and the decompressed data to be identical, or when the importance of exact duplication or an allowable deviation therefrom is unknown. Typical data types compressed by lossless data compression are executable programs and source code. Some image file formats, like Portable Network Graphics (PNG) or Graphics Interchange Format (GIF), typically use only lossless compression, while others like Tagged Image File Format (TIFF) and Multiple-image Network Graphics (MNG) may use either lossless or lossy compression.

Compression mechanisms may require different amounts of processing power to encode and decode. The quality of a compression method is often measured by a peak signal-to-noise ratio. The peak signal-to-noise ratio may measure the amount of error or noise introduced through a lossy compression of the image. However, the subjective judgment of the viewer is also regarded as an important, perhaps the most important, measure of compression accuracy.

SUMMARY OF THE INVENTION

There is an unmet need for, and it would be highly useful to have, a system and method for image compression that balances image quality (e.g., the accuracy of the compressed image data compared to the original image) and speed (e.g., the rate of data transmissions).

According to an embodiment of the invention, a system and method may dynamically alter the image quality (e.g., switching between lossy and lossless data, or varying degrees of data loss) depending on the available bandwidth or transmission rate, for example, increasing image quality when bandwidth increases and decreasing image quality when bandwidth decreases.

Some embodiments of the invention may overcome deficiencies of the background art by dividing an image into sub-regions and representing each of a plurality of image sub-regions by one or more template pattern(s) selected from a dictionary or database of pre-existing image template pattern(s). According to an embodiment of the invention, a first template pattern is selected from the dictionary or database that most closely matches one or more image features of the sub-region. If the first template pattern does not exactly match the sub-region, embodiments of the invention may add or select one or more additional template patterns, which, when combined with the first template, together more closely matches the sub-region. This process may repeat until the cumulative set of templates, when combined, substantially or exactly matches the sub-region.

Templates for representing a sub-region may be selected as follows. A first template pattern may be selected that is closest to the sub-region pattern. Next, the difference between the sub-region and the selected template may be computed, and a second template pattern may be selected that most closely matches that difference. A new difference may be computed between the sub-region and the combined pattern of the first and second templates. The third template may be selected to match that new difference. The process of adding template patterns may be iteratively repeated, each time reducing the difference or error. In each iteration, a new template may be selected that most closely matches a current difference or error between the sub-region and the cumulative or combined previous set of template patterns, and a new difference may be computed between the new template and the current difference. The process is repeated for each new template until the new difference is zero (the data is lossless) or until the new difference is below a predetermined threshold (the data loss is below a threshold), or until a maximum number of templates have been added to represent the sub-region.

The maximum number of templates may be an adjustable parameter, dynamically set according to the system's available bandwidth or transmission rate. For example, embodiments of the invention may increase the maximum number of templates used to represent a sub-region (improving compression quality) when the available bandwidth or transmission rate increases, and may decrease the maximum number of templates used to represent the sub-region (reducing compression quality) when the available bandwidth or transmission rate decreases. Since each sequential template corrects for an incrementally diminishing error, the greater the number of templates/codes used to represent a sub-region, the generally more accurate is the compressed data for the sub-region.

Additionally, or alternatively, some embodiments of the invention may dynamically alter compressed image data quality by dynamically changing the dictionary or database size (e.g., defined by the number or variety of template patterns) depending on the available bandwidth. For example, embodiments of the invention may use a larger dictionary with longer template identifier codes, thereby improving quality when the available bandwidth increases, and may use a smaller dictionary with shorter template identifier codes, thereby lessening quality when the available bandwidth decreases.

Additionally or alternatively, some embodiments of the invention may dynamically alter compressed image data quality by dynamically changing the size, dimensions or resolution of the divided image sub-regions and their corresponding template patterns depending on the available bandwidth. For example, the size of the sub-regions and template pattern may be decreased, thereby improving the resolution and compression quality when available bandwidth increases, and may be increased, thereby lessening the resolution and compression quality when available bandwidth decreases.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. Specific embodiments of the present invention will be described with reference to the following drawings, wherein:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Some embodiments of the present invention provide a system and a method for dynamically adjusting the quality of image data compression based on the available bandwidth.

Some embodiments of the invention may divide a source image into a plurality of sub-regions and represent each source image sub-region by one or more similar template pattern(s) from among a dictionary or database of pre-existing image template pattern(s). The source image may represent an image itself, or a change or difference between an image and another previous or reference image. Each template pattern may be uniquely identified by an identifier, code or number. Sub-regions that remain constant with respect to the previous or reference image sub-region may be represented by no data or a "null" data indicator (e.g., 0).

In order for the image data to be compressed, the source image may be represented by a plurality or sequence of unique identifiers associated with the template patterns for the plurality of source image sub-regions. A transmitting device, e.g., in video broadcasting or streaming applications, may transmit the sequence of unique identifiers to a receiving device. To decompress the image data, the receiving device may look up the templates associated with the received template identifiers in one or more dictionaries or databases, and combine the templates in order to restore one or more original source image frames.

In order for the size of the dictionary or database to be kept manageable, the dictionary or database may store only a subset of all possible template patterns. Accordingly, the closest template pattern may not perfectly match some source image sub-regions, producing lossy data when each sub-region is represented by a single template identifier. For lossless data or to reduce data loss, embodiments of the invention may use the dictionary of templates as the basic building blocks to add additional templates to create a composite template that exactly or more closely match each sub-region.

Figure 3:
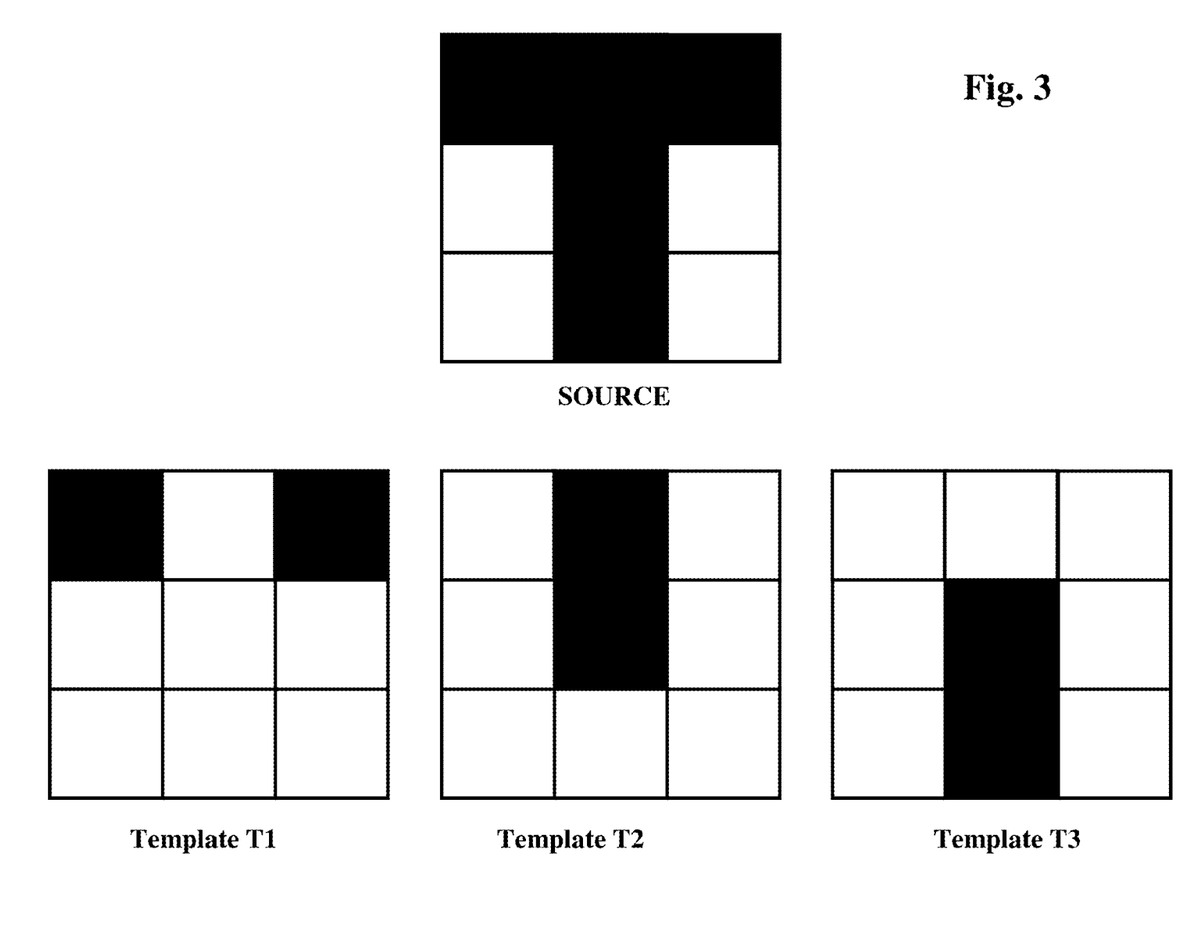
FIG. 3 is a schematic illustration of data structures for compressing image data, according to an embodiment of the present invention.

According to an embodiment of the invention, a single source image sub-region may be represented by a plurality of template identifiers, the templates which, when combined, form the exact or approximate original source sub-region, for example, as shown in FIG. 3. Thus, instead of transmitting a single template identifier per sub-region for generally lossy data, according to an embodiment of the invention, the transmitting device may transmit a plurality of template identifiers identifying a plurality of templates which together exactly represent the sub-regions (for lossless data) or substantially represent the sub-regions (for less lossless data). Image quality may be directly proportional to the maximum number of templates composed to represent each sub-region (e.g., increasing the maximum number of templates that are combined to represent a sub-region may increase the image accuracy of the restored image).

The choice between image quality (lossy or lossless data) and speed (e.g., relatively fast or slow transmissions) is generally a tradeoff. According to an embodiment of the invention, a system and method may dynamically alter the image quality (e.g., switching between lossy and lossless data, or varying degrees of data loss) depending on the available bandwidth. Each image source sub-region may be exactly represented by a plurality of N template identifiers, representing templates ordered from closest matching (first-order template) to least close or approximating the smallest error correction (Nth-order template).

Accordingly to some embodiments of the invention, a maximum number n of those N identifiers (n being an integer value between 1 and N) may be transmitted to represent each image sub-region, where the maximum number n is set depending on the available bandwidth. For example, if data speeds are slow and available bandwidth is narrow, the transmitting device may only transmit, e.g., the 1st or 2nd order template identifiers (n=2), whereas if data speeds are fast and available bandwidth is broad, the transmitting device may transmit from the 1st to the Nth order template identifiers in order to significantly improve image accuracy (e.g. n=5, 6, . . . , N). As data speeds and available bandwidth dynamically change over time, some embodiments of the invention may dynamically increase or decrease the maximum number n of template identifiers transmitted to represent each sub-region. Note, although n is the maximum number of allowable template identifiers, in some examples, less than that number may be used when an exact lossless match is achieved with fewer templates (e.g. when N<n).

The plurality of template patterns for each sub-region may be selected by adding a new template pattern that most closely matches the sub-region in the first iteration and then, in each subsequent iteration, adding a new template pattern that most closely matches any remaining error or difference between the sub-region and the combined template patterns. The iterative process may include: (a) selecting from a dictionary a template pattern that most closely matches the sub-region or a difference between the sub-region and one or more previously selected templates for that sub-region, and (b) determining a difference between the selected template pattern and the sub-region or the difference. If the difference determined in step (b) is non-zero, steps (a) and (b) may be iteratively repeated using a selected new template pattern that most closely matches the non-zero difference. However, the iterative process may end if the difference in step (b) is determined to be zero (e.g., for lossless data) or if the maximum number n of template patterns is selected. The process of selecting may repeat up to the maximum number n of iterations to generate up to the maximum number n template patterns, identified by up to the maximum number n of template coded. A compressed data set may be generated for the image, in which each sub-region is represented by up to the maximum number n of codes. As the maximum number n is dynamically adjusted according to the available transmission bandwidth, the image quality may change proportionally thereto, and the difference or error in the compressed data set may change inversely proportionally thereto.

Figure 4:
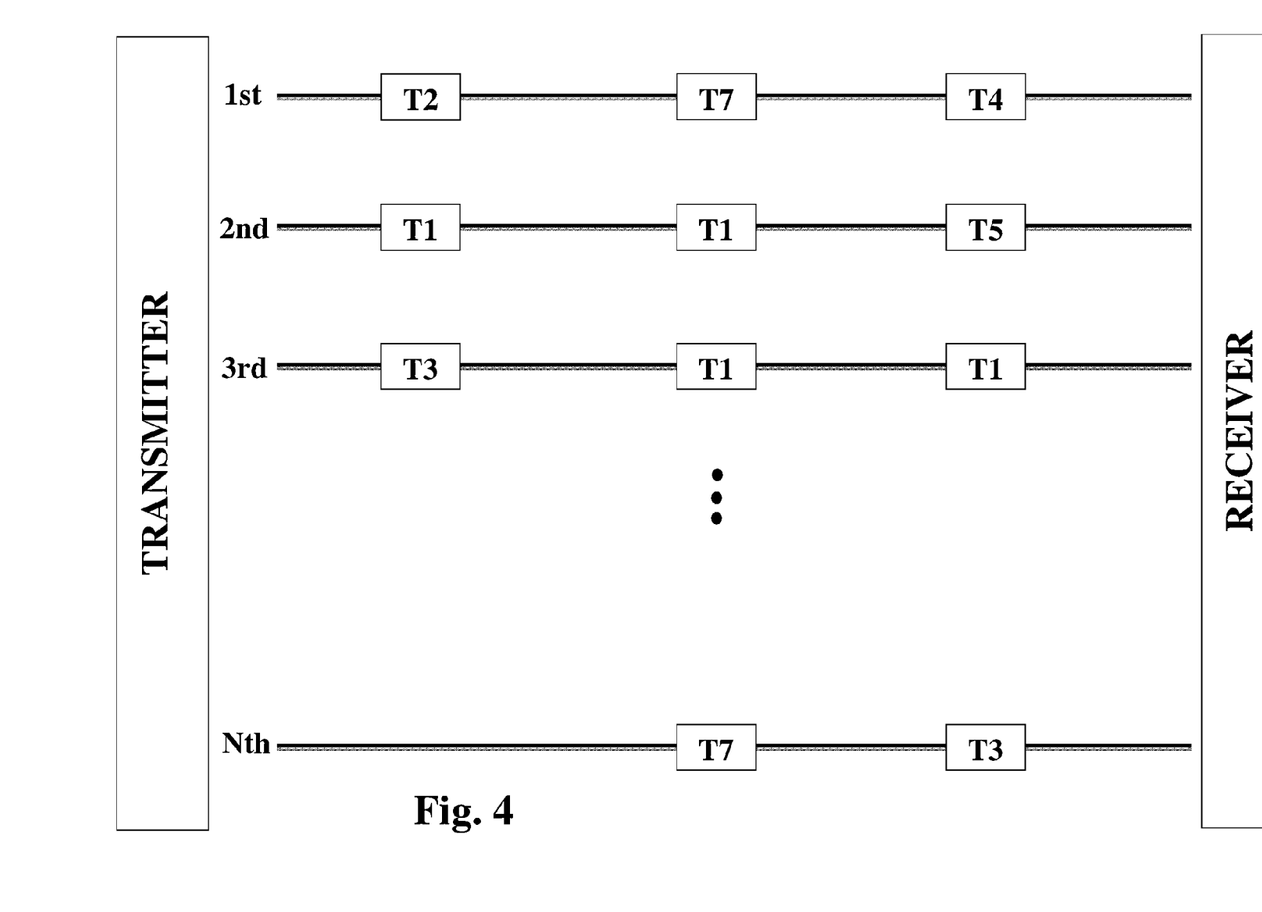
FIG. 4 is a schematic illustration of a system for transmitting and receiving compressed image data, according to an embodiment of the present invention.

In some embodiments, each of the n template identifiers representing an image sub-region may be transmitted in a separate stream. For example, all of the closest matching (first-order) template identifiers may be transmitted in a first stream, the next closest matching (second-order) template identifiers may be transmitted in a second stream, . . . , up to the nth closest (nth-order) template identifiers may be transmitted in an nth stream, for example, as shown in FIG. 4. As the available bandwidth increases or decreases, the transmitting device may increase or decrease the maximum number n of transmitted identifier streams, turning the n, n−1, . . . streams on and off. In one example, the first stream is always transmitted so as to always transmit the first-order template identifier (e.g., unless a sub-region is associated with the null or reference template, e.g., when there is no change in the image data). Beyond the first-order template identifier stream, each subsequent stream may be added/turned on in sequential order (m−1 order template added before m order) when bandwidth increases, or removed/turned off in reverse sequential order (m order template removed before m−1 order) when bandwidth decreases. Accordingly, when bandwidth is decreased, the least-significant (highest order) stream is dropped, thereby minimizing quality degradation. Similarly, when the bandwidth is increased, the most-significant (lowest order) unrepresented stream is added, thereby maximizing the improvement in quality. Identifiers from different streams may be associated to be combined with the same sub-region based on the identifier's sequence order, sub-region ID, sub-region frame coordinates, timestamp, value(s) indicating the number of consecutive transmission slots used for the sub-region, or any other identifier. When an exact template match is achieved with less than the maximum allocated number of frames or streams, any unused bandwidth may be reallocated, e.g., so as to improve transmissions of compressed data for other sub-regions.

In an alternative embodiment, instead of the n template identifiers for each sub-region being separated into n separate streams, all n template identifiers may be transmitted in a single stream. In such embodiments, the number of slots designated to represent each sub-region may change dynamically based on the available bandwidth.

Accordingly to an embodiment of the invention, a system and method may dynamically alter the image quality by dynamically changing the dictionary or database size (e.g., defined by the number or variety of template patterns) depending on the available bandwidth. The transmitting or receiving device may have access to multiple dictionaries, each with a different resolution or image quality and, therefore, number of templates. In one embodiment, each of the multiple dictionaries may be distinct, while in another embodiment each different dictionary may be generated by adding a set of templates to another dictionary so that each larger dictionary is inclusive of one or more relatively smaller dictionaries. In one embodiment, relatively higher resolution dictionaries have relatively more templates and associated identifiers than do relatively lower resolution dictionaries. The greater the number of templates, the greater the variety of templates, and, therefore, the more likely one or more templates will match original source sub-region generating better quality data. However, larger dictionaries require more information (e.g., a longer number, address or code) to uniquely identify each of the templates, and may use more bandwidth for transmitting, thereby slowing down the speed of transmitting the data. In order to optimize both quality and speed, embodiments of the invention may use the dictionary with a size or resolution predefined to correspond to a current available bandwidth or transmission speed. For example, relatively larger dictionaries may be used when the available bandwidth increases, and relatively smaller dictionaries may be used when the available bandwidth decreases.

Accordingly to some embodiments of the invention, there is provided a system and method to dynamically alter the image quality of compressed data by changing the size or resolution of the image sub-regions and/or template patterns depending on the available bandwidth. The quality of data compression may depend on the size of the sub-regions and/or templates. For example, for a set dictionary size, smaller templates generally more closely match smaller regions improving quality since there are fewer possible pattern combinations as compared to larger sub-regions. However, reducing the size of the sub-region and/or template patterns increases the number of sub-regions that need to be compressed, thereby generally increasing the amount of image data. To balance these factors, the size of the sub-regions and/or template patterns may be decreased when available bandwidth increases and may be increased when available bandwidth decreases.

Some embodiments of the invention may divide an image into a plurality of sub-regions and represent each image sub-region by up to a maximum number of template pattern(s) retrieved from a dictionary or database of pre-existing image template pattern(s). For example, if a portion of an image contains primarily green hues, such as that of a forest scene containing grass and trees, a green template may be used to represent the image portion. Optionally, an entire image may be tagged with an overall (e.g., average) template pattern, while the individual pixels of the image are represented by data relative to that template pattern (or optionally a plurality of template patterns). In such embodiments, instead of representing each pixel as an absolute measure (e.g., red, blue, or green), each pixel value may measure a property (e.g., a level of "red-ness," "blue-ness," and/or "green-ness") relative to the (e.g., red, blue, and/or green) template pattern(s). Since the template pattern(s) approximate the original image, many pixels may exactly match the template pattern so that no image data may be used to represent those pixels. According to such embodiments, a smaller amount of data may be used to represent an image in comparison to the original image data and, as such, may be more efficient to transmit and store.

Such embodiments may be equally applied to a portion of an image, a full image or a series of full images (e.g., a moving image stream) where a plurality of groups of pixels are described by a constant or governing function attribute, such as for example a template pattern with color. An image may be divided into sub-regions in a number of ways. For example, an image matrix may be linearly divided to represent a smaller group of pixels within the image, for example, where each p×p-dimensioned sub-matrix of the image may represent a sub-region. Known algorithms for image division, for example, but not limited to "k-means" or other algorithms for selecting areas or sub-regions of pixels, may optionally be utilized to identify sub-regions within the image. Larger sub-regions may be used with composites of multiple templates than with single template sub-regions because the composites may form a greater number of patterns.

The image may be divided into a plurality of sub-regions, each sub-region forming a sub-matrix of the image matrix and thus representing a sub-region of pixels. For example, each sub-matrix may represent a square, rectangle or other polygon, of a plurality of pixels. As a non-limiting example, each square may optionally include values for a 9×9 pixel sub-region.

Once the image has been divided into a plurality of sub-regions, the color or other image features may be examined for that sub-region. The image feature examined may be the most dominant feature in the sub-region. For example, if the image feature is related to a pattern with a particular color, then the most dominant color in that sub-region may be examined. The dominant color (or other image feature) may then be compared to a plurality of such colors (or other image features) stored in a dictionary or image feature database. A processing unit may automatically determine which of the dictionary colors (or other image features) most closely matches the colors (or features) for each sub-region. Alternatively, a plurality of colors may be examined for each sub-region, in which case the above process may be performed with regard to the plurality of colors and their relative location(s).

Next, a first template pattern with image feature representation that most closely matches each sub-region may be selected from the dictionary. When no single template pattern in the dictionary exactly matches the sub-region, multiple template patterns (up to a maximum number n) may be used to represent the sub-region, multiple template patterns which, when composed, combined or overlaid, exactly or approximately match the sub-region. Templates may be additive or subtractive, e.g., indicating which pixels to add or subtract, respectively, to/from the composite template. All of the pixels in that sub-region may then be replaced by the corresponding pixel values of the template pattern(s). Each of the template pattern(s) may be represented by a dictionary number (e.g., a code, address or other reference marker uniquely identifying a template pattern or function in the dictionary). In some embodiments, only the dictionary numbers for the matching template patterns may be sent, stored, or otherwise used, to represent or encode the plurality of pixels in each sub-region, thereby resulting in significant decrease in the amount of data required to represent the pixels in each image sub-region. In some embodiments, the maximum number of template patterns or codes that are transmitted may be dynamically adjusted, e.g. proportionally, based on the available transmission bandwidth, for example, increasing to improve quality when bandwidth increases and decreasing to reduce quality when bandwidth decreases. In some embodiments, a user may specify a threshold below which the maximum number cannot decrease or a threshold difference between the ideal and maximum number of transmitted codes above which the difference cannot reach, e.g., to maintain a minimum permissible quality.

According to some embodiments of the present invention, each template pattern may include values for a plurality of image features, properties, or variables. The image features or variables may include, but are not limited to, color, color gradient, gradient direction, or reference pixel.

In some embodiments, compressed data representing pixels sub-regions may be a template identifier reference to one or more similar template pattern(s) or value functions from the dictionary. The compressed data may be "lossy" when the maximum number n of template identifiers transmitted is less than the total number of template patterns that generate an ideal image sub-region. In some embodiments, in order to generate a "lossless" compression, all N template pattern codes may be transmitted or an additional difference (or "error") value may be assigned to each pixel defining the difference between the n template pattern(s) and the original image. The original image may thereby be exactly reconstructed (decoded) by using the n template pattern(s) and then adding the error values for each pixel.

The reverse action, to decode compressed data in which the image is reconstructed from the template pattern, may be executed by a processor or decompression module. The decompression module may retrieve the template patterns or closest function attribute representations of the image from the dictionary or database (e.g., identified by the dictionary identifier code). The decompression module may use the transmission's order or identifiers within the transmission to determine the position or sub-region in the image represented by the code. The decompression module may compose the template patterns representing each individual sub-region (and optionally error data) to reconstruct the original image sub-region. The sub-regions may then be arranged side-by-side to represent an image frame and/or the image frames in sequence to represent a moving image.

When lossy compression is used, any difference between the composed template patterns and the original image sub-region is data lost by the compression. When a lossless compression is used, the difference or error values may be recorded for each pixel and sent to the decoder, for example, together with or separately from the template data, to recreate the original image, with no (or negligible) loss of data regarding the difference between the template pattern and the original image. In one embodiment, when bandwidth is low, the error data is not sent and its transmission may be postponed until a time when the bandwidth increases. In such embodiments, an originally streamed broadcast may be lossy (transmitted without error data), but when replayed at a later time may be lossless (when the error data is later transmitted).

With lossy compression, the closer the template pattern and original image match, the less data is lost. When lossless compression is used, the closer the template pattern and original image match, the less error data is stored and transmitted with the compressed image data (a perfect match yields no error data). In order to improve the accuracy of lossy compression or to reduce the amount of error data used in lossless compression, the dictionary may be adjusted during the compression process to better fit the original images.

In one embodiment, a plurality of modified dictionaries may be provided with additional or modified template pattern(s). For example, for image transmission, the dictionary or just the modified portions thereof may be sent periodically, at least more than once, as the image is compressed and sent.

For example, assume an initial image is represented by a matrix that is 9 pixels by 9 pixels, giving an overall 81 pixel image. This image may be divided, for example, into 3×3 pixel sub-regions or sub-matrices. Each sub-region may be evaluated for one or more relevant patterns of one or more of the above image features or variables. A set of template patterns may be selected, which when combined, form the closest match to the original sub-region. It may be noted that not all templates in the set need to be similar to the sub-region, but some may complement other templates in the set so that the overall combined template is similar to the sub-region. In one embodiment, if no pattern in the dictionary shows a significant benefit over the others, a default template pattern may be used, for example, one having the least amount of data, such as a monochromatic template with an average color value. In another embodiment, if a sufficiently close template pattern, composite of multiple template patterns, or composite of less than a threshold number of template patterns, is not present in the dictionary, then a new template pattern, e.g., the unmatched sub-region, may be added to the dictionary. The new template pattern may replace a previously existing (e.g., least-recently or least-frequently used) pattern in the dictionary or may be added as an additional pattern. Additionally or alternatively, the pattern to be replaced may be the pattern that is closest to the new pattern or the pattern that is most different from other pre-existing patterns in the dictionary, for example, to provide a wider range of template options. In another embodiment, the most recently used composite may be used as a first-order approximation for the next adjacent sub-region, or in a moving image, for the same sub-region in a subsequent frame.

In some embodiments, a processor may automatically determine which of a set of template patterns in the dictionary may be combined to be "closest" to an original image or image sub-region. The first selected (or highest order) template in the set may be the template that most closely matches the sub-region as a whole, the next (second order) template may be the template that most closely matches the difference between the sub-region and the first template, the third (third order) template may be the template that most closely matches the difference between the composed first and second templates and the sub-region; and so on.

The "closeness" of template patterns to an original image or image sub-region may be determined according to any type of pattern or image comparison function known in the art. In some embodiments, greater emphasis may be placed upon closeness of some features (e.g., the color of individual pixels) than other features (e.g., an overall color and/or intensity gradient, or vice versa). For example, the processor may rank or score each template using a weighted comparison function, where the comparison of different features may be given different weights or priorities.

Once the representative template pattern(s) have been selected to represent each image sub-region, the sub-region may be represented by the number, code or address in a dictionary corresponding to those template(s). When multiple dictionaries are used, a dictionary identifier may also be transmitted, e.g., once upon changing the dictionary; otherwise a default dictionary may be used. Optionally, the compressed data may include the size or dimensions of the image sub-region; however, if an image is divided into equal sized sub-regions, then this size descriptor need not be included or may only be included once with the data, or each time the size of the sub-regions changes. In addition, the compressed data may include the relative location of each sub-region within the original image; however, if the image sub-regions are compressed according to a predetermined or expected order, then the location of each specific sub-region need not be included.

If the compressed data defines a plurality of features of an image, each feature may be represented as a coordinate in a vector. The vector may include not only a color number but other information as well, such as for example, a starting color, color gradient, direction of color gradient and pixel reference mark. Therefore, an initial image of 81 pixels divided into nine 3×3 pixel sub-regions, may be defined by 9 "pixel vectors," each vector defining image values for the plurality of chosen features for each sub-region. Consolidating the different feature values into vectors may reduce the overall storage size of the data and computation burden on the processing units, for example, reducing the number of variables processed by about 45% from 81 (9×9) to 36 (9×4). The data size may be further reduced when successive images are processed, for example, over a short period of time. Each successive image may be a function of the original base vector variables; therefore, over time, since each image reduces the number of variables processed by about 45%, this reduction may be multiplied for each image that is processed. To further reduce the image data size, each image sub-region may be represented by a simple binary pattern of only two colors (e.g., instead of three or four colors).

According to some embodiments of the invention, rather than determining the above set of one or more variables for each sub-region separately, the process may also provide a plurality of patterns and then select a pattern which is suitable for each sub-region or group of sub-regions. The patterns provided in a dictionary may be predetermined or fixed and/or generated or at least adjusted during image compression.

The number of template patterns available for compressing an image may be proportional to, on the order of, or relatively high compared to, the number of individual pixels, the number of rows of pixels, or any dimensions of pixels, in the image. In one example, the number of template patterns may be approximately equal to the square root of the number of pixels in a sub-region (for example, for a sub-region of 256× 256 pixels, there may be 256 available patterns). Other or different numbers of patterns may be provided. Although increasing the number of patterns typically increases the size of the dictionary, increasing the number of patterns may also increase the accuracy of the images compressed using the patterns.

Each pattern may include image information, such as gradients of color and/or other image features, reference pixel, gradient direction and so forth. A pattern may be selected for each sub-region from the dictionary of patterns. A reference color may also be selected for each sub-region, which may, for example, be the average color of the pixels in the sub-region. The patterns may be constructed prior to processing or compressing images for providing a pre-defined dictionary, which may for example be at least partially determined heuristically. If a pattern sufficiently similar to the image data for a sub-region is not found in the dictionary, a standard "downsampling" technique may be applied to reduce the size of the sub-region. In another embodiment, when no sufficiently similar pattern is found, additional template patterns may be added to generate a composed template pattern that matches the sub-region.

Alternatively or additionally, a new pattern may be generated to sufficiently match the image sub-region and may be added to the dictionary of patterns. For example, the new pattern may be an exact copy of the sub-region or modified therefrom. A processing unit may establish a threshold to determine which patterns are "sufficiently similar," for example, according to a comparison of parameters for the patterns. The higher the threshold for similarity, the more accurate the image compression may be. In some embodiments, a viewer may define or refine the image compression accuracy standard by comparing reconstructed images from compressions with different similarity thresholds with an original image and selecting, for example, by visual inspection, which of the reconstructed images and, therefore, which similarity thresholds are acceptable.

A local processing unit may subdivide and compress images as described herein and may then transmit and/or store the compressed image data. A local processing unit may receive and/or reconstruct the images to obtain the complete images, e.g., for display.

Figure 1:
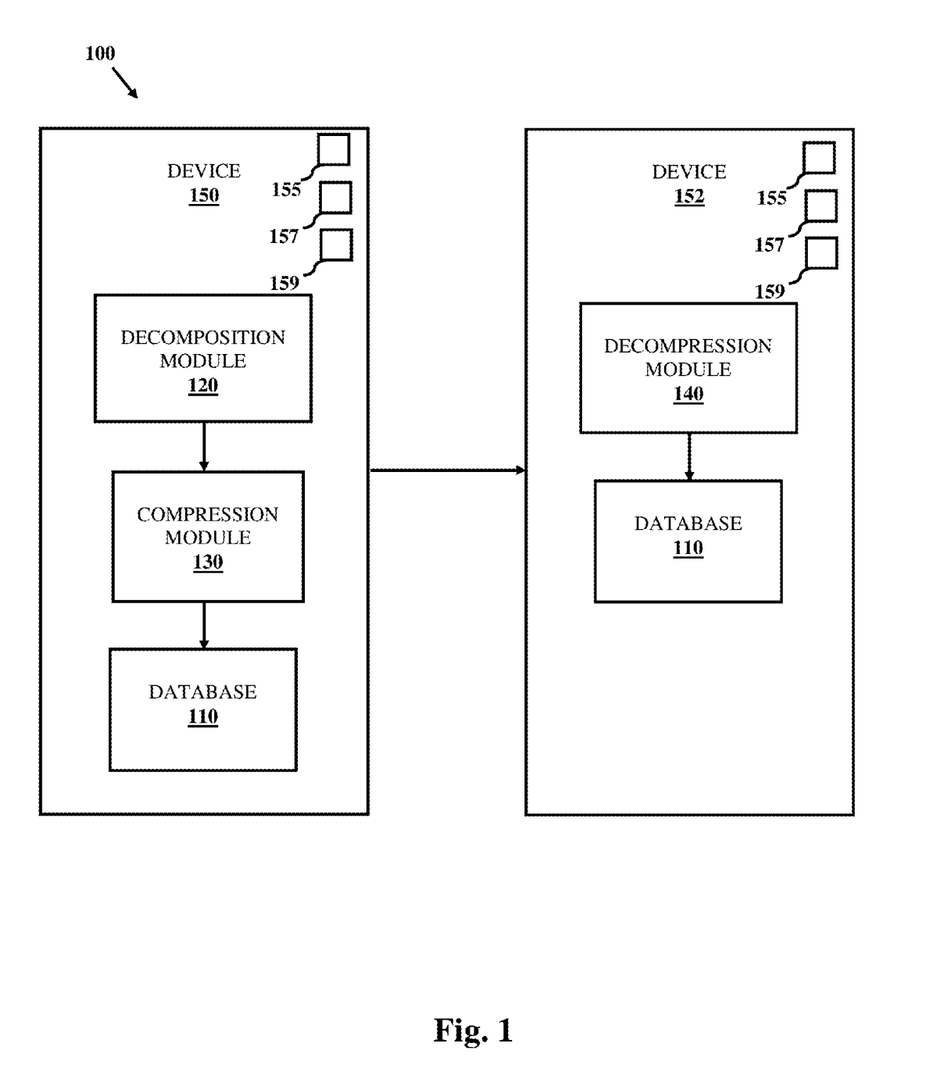
FIG. 1 is a schematic illustration of a system for compressing and decompressing image data, according to an embodiment of the present invention.

Reference is made to FIG. 1, which schematically illustrates a system 100 for compressing and decompressing image data, according to an embodiment of the present invention.

System 100 may include one or more transmitting devices 150 and one or more receiving devices 152 from which image data may be transmitted and received, respectively. Devices 150 may include a sub-region decomposition module 120 for decomposing each image into a plurality of sub-regions, and a compression module 130 for compressing the data of each sub-region. Devices 150 may include a decompression module 140 for reconstructing the sub-region represented by template patterns in the compressed data and a composition module 120 for composing each of the plurality of sub-regions back into an image. Modules may include special-purpose or general-purpose hardware or software executed by a processor, e.g. 155. Devices 150 and 152 may each internally include or have access to an external database 110 for storing a dictionary of template patterns and/or compressed images. Although devices 150 and 152 are shown to include some different units for compressing and decompressing, respectively, each device may have components for both compressing and decompressing image data, though these components were omitted for clarity.

Devices 150 and 152 may be computer devices, servers, video or image capture or playback devices, cellular devices, or any other digital devices such as cellular telephones, personal digital assistants (PDA), video game consoles, etc. Devices 150 and 152 may include any devices capable of executing a series of instructions to record, save, store, process, edit, display, project, receive, transfer, or otherwise use or manipulate video or image data. Devices 150 and 152 may include output devices 155 (for example, a monitor, projector, screen, printer, or display) for displaying video or image data on a user interface. Each of devices 150 and 152 may include one or more processors 157 and one or more memories 159. Processors 157 may include a central processing unit (CPU), a digital signal processor (DSP), a microprocessor, a controller, a chip, a microchip, a field-programmable gate array (FPGA), an application-specific integrated circuit (ASIC) or any other integrated circuit (IC), or any other suitable multipurpose or specific processor or controller.

It may be appreciated that each of database 110, decomposition module 120, compression module 130, decompression module 140 may be integral to devices 150 and/or 152 (for example, part of the same stand-alone computer) or separate from devices 150 and/or 152 (connected via a wired or wireless network).

Sub-region decomposition module 120 may divide an image into a plurality of sub-regions, where each sub-region may be defined by one or more governing features, such as, color and optionally one or more relevant variable values, for the sub-region. Sub-region decomposition module 120 may divide an image in a number of ways. For example, an image matrix representing the image pixel values may be linearly divided into smaller groups of pixels within the image, for example, into a plurality of sub-matrices, each of which represents an image sub-region. In some embodiments, the shape, size or number of pixels of each sub-region may be dynamically adjusted based on the available bandwidth for compressed data transmissions. Known mechanisms for image division may be used, for example, but not limited to, "k-means" or other methods for clustering pixels, to identify sub-regions within the image.

Once the image sub-regions are defined, compression module 130 may select up to a maximum number n of template patterns per sub-region, which together represent each sub-region, for example, from a dictionary of template patterns stored in database 110. Compression module 130 may then compress the sub-regions into up to n template codes identifying the up to n template patterns. Each template pattern may include image information, such as, color gradient, reference pixel, gradient direction and so forth. A reference color may be selected for each sub-region, which may be, for example, the average, median or mode, color of the pixels in the sub-region.

The compressed image data may be saved in database 110 or memory 159 of device 150 and may be transmitted to device 152 for decompression. When device 152 requests a reconstructed image, decompression module 140 may use the template codes to identify and retrieve the associated template patterns to combine and reconstruct each compressed image sub-region and combine the sub-regions to exactly or approximately replicate the original image, and may combine multiple images to form a video.

Sub-region decomposition module 120 may divide images into sub-regions, compression module 130 may compress images, and decompression module 140 may reconstruct images using a local processing unit, for example, processor 157. The local processing unit may then send the reconstructed image to an output controller to be displayed on output device 155.

Figure 2:
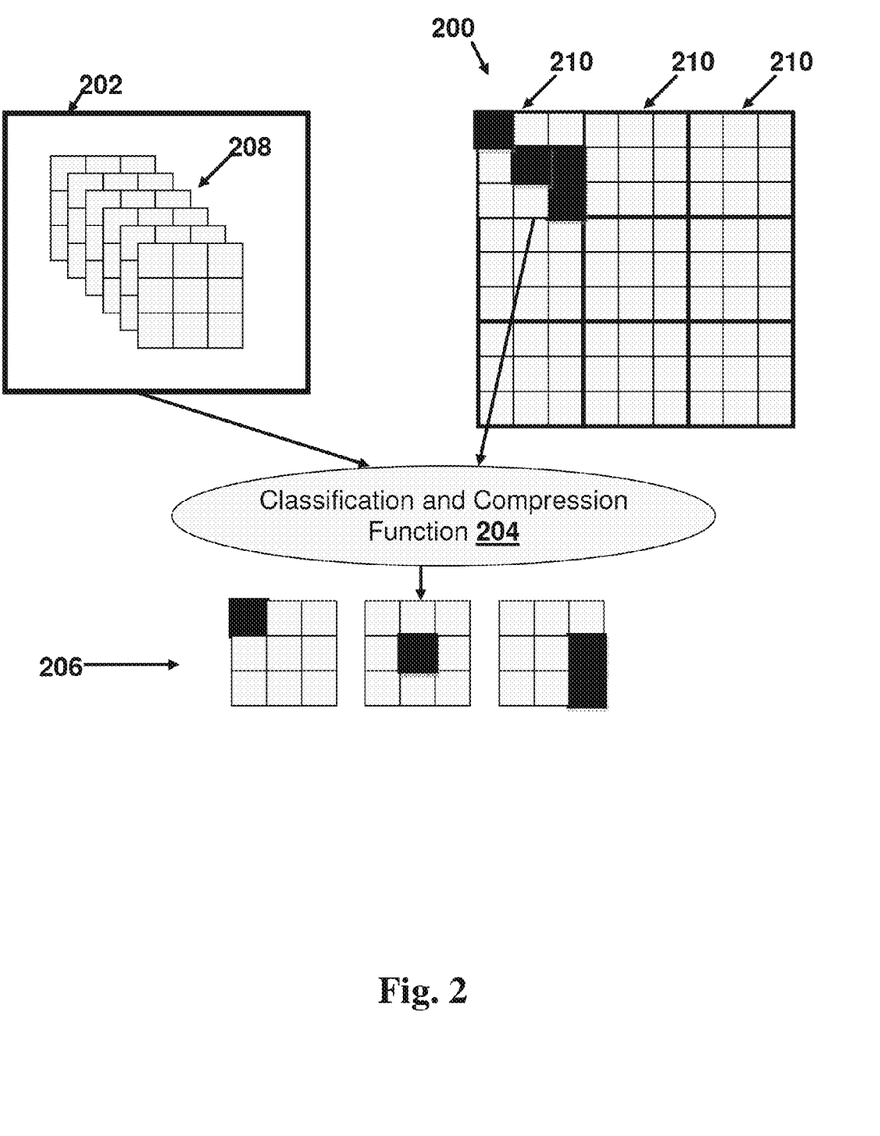
FIG. 2 is a schematic illustration of data structures for compressing image data, according to an embodiment of the present invention.

Reference is made to FIG. 2, which schematically illustrates data structures for compressing images, according to an embodiment of the present invention. The data structures may include a sub-region dictionary 202 with a plurality of template patterns 208 for representing a plurality of sub-regions 210 in an original image 200. Template patterns 208 may be pre-determined and generated, for example, heuristically, prior to image compression. Alternatively and/or additionally template patterns 208 may be generated dynamically, for example, in real time for each image or a plurality of images using a current image and/or one or more preceding images. A compression module (e.g., compression module 130 of FIG. 1) may use a classification and compression function 204 to select up to a maximum number of template patterns 206 from dictionary 202 to compress each sub-region of original image 200. The compression module may use classification and compression function 204 to select up to a maximum number of template pattern(s) 206 from dictionary 202, which most closely match the image features, including color or other representative function attributes, of each of a plurality of sub-regions 210 of original image 200. The compression module may represent each sub-region 210 by the selected template pattern(s) 206 to generate compressed image data. Compressed image data may represent each sub-region 210 of original image 200 by up to a maximum number of pointers or identifiers to patterns 208 in dictionary 202 and/or a color description, such as a color value or code.

A computer or server (e.g., device 150 of FIG. 1) may generate template patterns 208 in dictionary 202 that provide a range and detail of template options, defined, for example, according to any of a plurality of parameters, including, but not limited to, a predetermined or selected amount of desired compression accuracy, a maximum data size for each compressed image 206, sub-region, pixel square, rectangle or other pixel groupings, and/or any other criteria. In some embodiments, the computer may generate the template patterns 208 in dictionary 202 in a dynamic manner, for example, using image patterns from the actual images being compressed. For a video stream or sequence of similar images, the template patterns 208 in dictionary 202 may be adjusted to compress a current original image 200 according to the image features of previous image frames in the stream. The computer may generate the template patterns 208 in dictionary 202 according to both dynamic (e.g., adapted during processing) and heuristic (e.g., predetermined) characteristics.

When dictionary 202 is modified, the entire dictionary 202 or just the modified portions thereof may be periodically or iteratively transmitted to the compression module, for example, from a database (e.g., database 110 of FIG. 1) where dictionary 202 is stored or directly from the computer generating the changes. When the modified portions of dictionary 202 are periodically transmitted, the entire dictionary 202 may only be transmitted once, for example, for each compression module, project, session, or set of images, thereby reducing the amount of data to be transmitted.

Overall, the quality of the image compression (e.g., the closeness of the compressed image data and the original image 200) may be dynamically adjusted by a variable number defining the maximum number of templates composed per sub-region, which may be dynamically adjusted according to the available bandwidth. For example, if the compression module requires a number N of template patterns 208 greater than the maximum number to exactly match the particular function attribute for each sub-region 210, then the compression may be lossy, while if the compression module requires a number N of template patterns 208 less than or equal to the maximum number to exactly match the particular function attribute for each sub-region 210, then the compression may be lossless. The extent to which the compression is lossy (e.g., the amount of data lost or the error in the image compression) may depend upon the maximum number.

Reference is made to FIG. 3, which is a schematic illustration of data structures for compressing image data, according to an embodiment of the invention. In FIG. 3, an original source image sub-region (S) is compressed. A first template (T1) is selected which most closely matches the source image (S). The most closely matching template generally has the greatest number of pixels in common with the sub-region (or in the example, in FIG. 3, where there is the same number of matching pixels for multiple templates, the upper-right pixels are matched first). Template 1 is subtracted from the source (S−T1) to produce an error (E1) equal to the center column of pixels. The second template (T2) is selected that most closely matches that error (E1) (matching upper-right pixels first). The composite of templates 1 and 2 is subtracted from the source (S−(T1+T2)) to produce a new error (E2) equal to the center-bottom pixel. The third template (T3) is selected that most closely matches that error (E2). The composite of templates 1, 2 and 3 is subtracted from the source (S−(T1+T2+3)) to produce a zero error, ending the process.

Reference is made to FIG. 4, which is a schematic illustration of a system for transmitting and receiving compressed image data, according to an embodiment of the invention. A transmitter may transmit up to a maximum number of n streams at a time, which may be varied depending on the bandwidth. The transmitter may increase the number of streams when bandwidth increases and decrease the number of streams when bandwidth decreases. Each nth stream may transmit nth-order templates. Adding a stream may increase the number of templates composed and thus the compression accuracy. In the example of FIG. 4, only three streams are initially transmitted (representing each sub-region by three templates). After a period of time, the available network bandwidth increases and the transmitted begins to send N streams of data.

Figure 5:
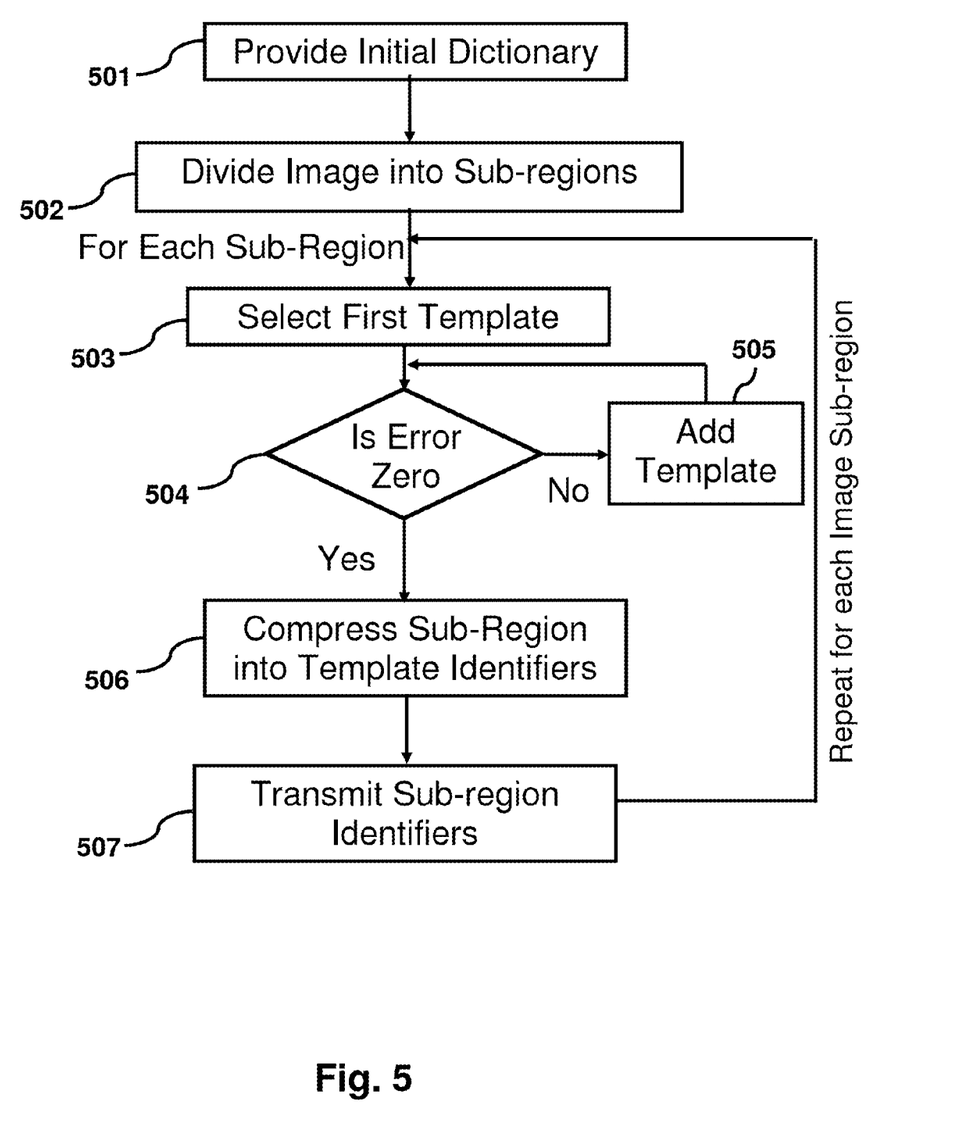
FIG. 5 is a flowchart of a method for compressing image data for an image frame, according to an embodiment of the present invention.

Reference is made to FIG. 5, which is a flowchart of a method for compressing image data for an image frame, according to an embodiment of the invention.

In operation 501, a database (e.g., database 110 of FIG. 1) may provide a compression module (e.g., compression module 130 of FIG. 1) with an initial dictionary having a plurality of template patterns. The initial dictionary may be received, for example, even before a first image or image sub-region is analyzed. A computer or server (e.g., device 150 of FIG. 1) may generate the dictionary template patterns, for example, according to one or more heuristic rules and/or predetermined characteristics.

In operation 502, a decomposition module (e.g., decomposition module 120 of FIG. 1) may receive a first image and may divide the image into a plurality of sub-regions. The sub-regions may be determined geometrically (e.g., the first image is subdivided to generate a predefined number of sub-regions having predetermined dimensions) or based on image content (e.g., the first image is divided along boundaries identified by significant changes in image features such as color).

In operation 503, the compression module may receive a first image and may analyze the image features of the entire image together or of each sub-region separately. The compression module may use a classification and compression function (e.g., classification and compression function 204 of FIG. 2) to determine and/or select a first template pattern from the initial dictionary with the most similar image features.

In operation 504, the compression module may determine if the error between the selected template pattern(s) and the image sub-region is zero. If so, the process may proceed to operation 506. If not, the process may proceed to operation 505 to select another template with the most similar image features to the error. The process may proceed to operation 504 to determine the new error between the source sub-region and all of the combined selected templates. Operations 504 and 505 may repeat until the error is zero or until a maximum number of iterations or templates is reached, and then the process may proceed to operation 506.

In operation 506, the compression module may compress the first image using the template patterns selected in operation 503 and/or 505, for example, by representing the image or each sub-region by a sequence of one or more identifiers identifying the selected template patterns in the dictionary. In order to generate an exact duplicate of the original image or image sub-region (i.e., "lossless" compression), a zero difference or "error" value may be determined in operation 504 or a non-zero error may be transmitted along with the identifiers to represent the sub-region. This difference or "error" value may take many possible forms, including, for example, a two-dimensional matrix, wherein the value of each element represents the difference between the values of the corresponding pixels in the original image or sub-region and a composite of the selected template patterns as represented in a two-dimensional pixel array. In this case, the sum of the two-dimensional difference matrix and the two-dimensional composite template pixel array may be a two-dimensional matrix that represents a pixel array of the original image or original image sub-region.

In operation 507, the compression module may transmit the identifiers for the selected template patterns in the dictionary, and optionally a difference or "error" value, if applicable, to a decompression module (e.g., decompression module 140 of FIG. 1) for decompressing the first image frame, as described in greater detail below in reference to FIG. 6.

Operations 502-507 may be repeated for each additional image frame. Furthermore, if the dictionary is updated with a new template pattern, the new template pattern and/or entire updated dictionary may be transmitted at the end of the aforementioned process, after all images or their sub-regions have been matched to template patterns, or alternatively, more than once during the process, for example, for accommodating one or more updates to the dictionary that may occur during the process. In some embodiments, if an entire image is analyzed as a whole, a process may skip operation 502.

Figure 6:
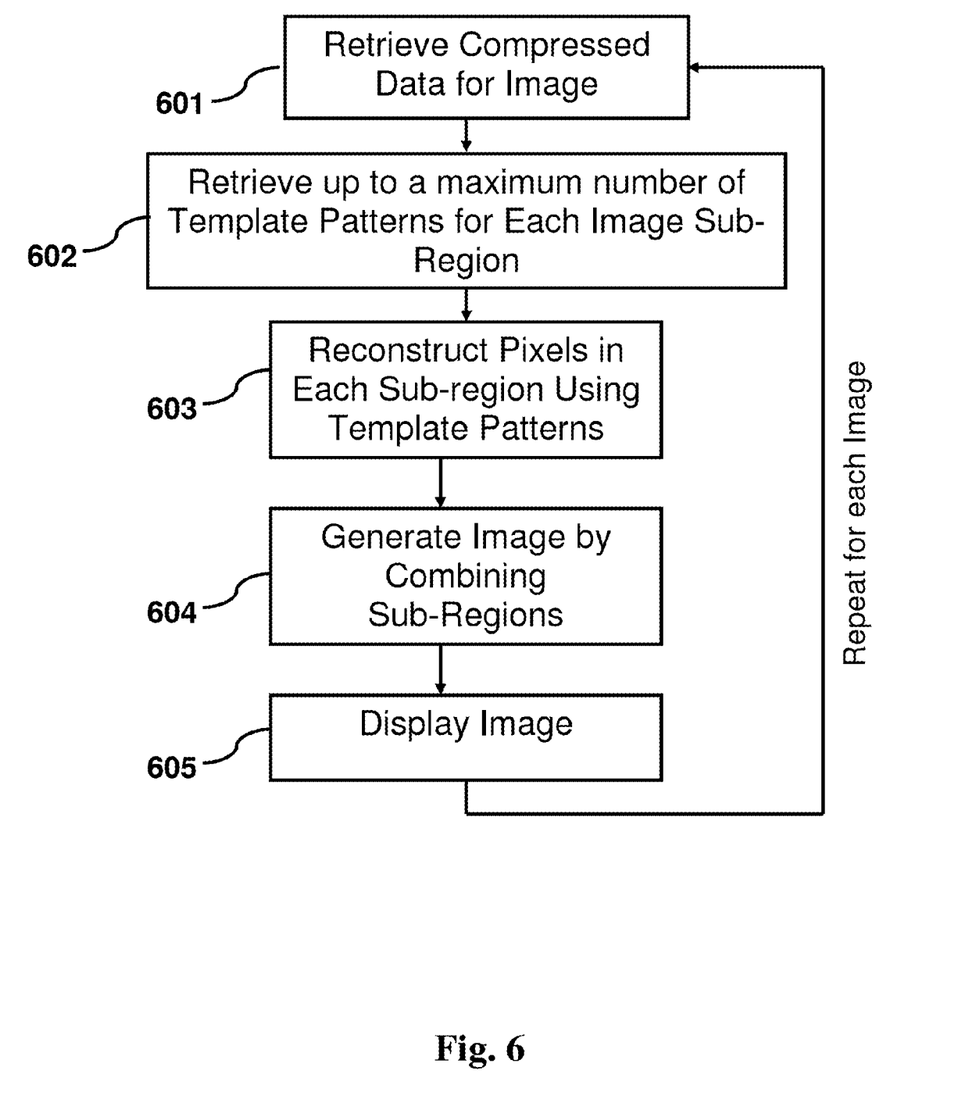
FIG. 6 is a flowchart of a method for decompressing image data to restore an original image frame, according to an embodiment of the present invention.

Reference is made to FIG. 6, which is a flowchart of a method for decompressing image data to restore an original image frame, according to an embodiment of the invention. The method may decompress data, which was compressed, for example, according to embodiments described in reference to FIG. 5.

In operation 601, a decompression module (e.g., decompression module 140 of FIG. 1) may retrieve compressed data for an image frame. The image may have been divided into a plurality of sub-regions (e.g., as described in operation 502 in reference to FIG. 5). The decompression module may execute operations 602 and 603 for each sub-region of the image frame, as follows:

In operation 602, the decompression module may receive up to a plurality of template pattern identifiers, and in some cases, a difference or "error" values, if applicable, for the current sub-region from the compressed data. The template pattern identifiers may include an addresses, pointers, or codes, to a dictionary or database location storing template patterns.

In operation 603, the decompression module may use the sequence of identifiers to access the dictionary and retrieve the plurality of template patterns. The decompression module may compose the template patterns in order of the template identifiers to reconstruct the sub-region.

In order to generate an exact duplicate of the original image sub-region (i.e., "lossless" compression), the decompression module may compose a sufficient number of templates or may use the difference or "error" values defining the differences between the composite template pattern(s) and the original image sub-region.

In operation 604, the decompression module may combine all the decompressed sub-regions to recombine the decompressed image data to generate an image. The decompression module may transmit the generated image to a computer or server (e.g., device 150 of FIG. 1).

In operation 605, an output device (e.g., output device 155 of FIG. 1) of the computer or server may display the generated image.

If there are multiple images, such as multiple frames in a video stream, operations 603-605 may be repeated for each image. The operations 603-605 may be run in sequence or in parallel for the multiple image frames.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller (for example, processor 157 of FIG. 1) to carry out methods disclosed herein.

While the invention has been described with respect to a limited number of embodiments, it will be appreciated that many variations, modifications and other applications of the invention may be made.

The invention claimed is:

1. A method for compressing digital image data in a computing device, the method comprising:
   dividing an image into sub-regions;
   determining a maximum number of template codes for representing each sub-region, each template code uniquely identifying a template pattern in a dictionary including a plurality of predetermined template patterns;
   associating each of a plurality of the sub-regions with a plurality of template patterns, each of which individually does not match the sub-region, but which when combined together more closely match the sub-region;
   generating a compressed data set for the image, in which each sub-region is represented by up to the maximum number of template codes uniquely identifying the associated plurality of template patterns; and
   transmitting for each sub-region the up to the maximum number of template codes from the compressed data set, wherein the maximum number of template codes is a dynamic parameter adjustable based on the bandwidth available for transmitting.

2. The method of claim 1 comprising selecting the plurality of template patterns for each sub-region by:
  (a) selecting from a dictionary a template pattern that most closely matches the sub-region or a difference between the sub-region and a combination of one or more previously selected templates for that sub-region;
  (b) determining a difference between the selected template pattern and the sub-region or the difference;
  if the difference determined in step (b) is non-zero, iteratively repeating steps (a) and (b) using a new selected template pattern that most closely matches the non-zero difference; and
  ending iteratively repeating if the difference determined in step (b) is zero, below a threshold, or the maximum number n of template patterns are selected.

3. The method of claim 1, wherein when the bandwidth available for transmitting is less than a threshold, the maximum number of template codes is less than a number needed for lossless compression, thereby transmitting lossy compressed data.

4. The method of claim 1, wherein when the bandwidth available for transmitting is greater than or equal to a threshold, the maximum number of template codes is greater than or equal to a number needed for lossless compression.

5. The method of claim 1 comprising increasing the maximum number when the bandwidth available for transmitting increases and decreasing the maximum number when the bandwidth available for transmitting decreases.

6. The method of claim 1, wherein if fewer than the maximum number of codes are needed to generate lossless data, redesigned extra available bandwidth associated therewith to transmit compressed data for one or more other sub-regions.

7. The method of claim 1, wherein the up to the maximum number of template codes for each sub-region are ordered according the order in which their associated template patterns is selected or how closely their associated template patterns match the sub-region.

8. The method of claim 7, wherein each of the up to the maximum number of template codes associated with the same sub-region is transmitted in a separate data stream, wherein the first template code is transmitted in a first stream, the second template code is transmitted in a second stream, . . . , up to the maximum number template code is transmitted in an up to the maximum number nth stream.

9. The method of claim 8 comprising transmitting one or more additional streams when the bandwidth available for transmitting increases and transmitting one or more fewer streams when the bandwidth available for transmitting decreases.

10. A method for compressing digital image data in a computing device, the method comprising:
  dividing an image into a plurality of image sub-regions;
  selecting a dictionary from among a plurality of dictionaries based on an indication of a currently available bandwidth, wherein each dictionary has a different size defining a different number of template patterns for compressing the image sub-region, wherein the dictionary is selected that has a size predefined to correspond to the currently available bandwidth;
  selecting, from the selected dictionary, one or more template patterns that most closely match one or more image features of the image sub-region; and
  dynamically switching the selected dictionary for compressing one or more subsequent image sub-regions when an indication is received that the currently available transmission bandwidth has changed.

11. The method of claim 10 comprising switching to select a larger dictionary comprising a greater number of template patterns when an indication is received that the currently available transmission bandwidth has increased.

12. The method of claim 10 comprising switching to select a smaller dictionary comprising a fewer number of template patterns when an indication is received that the currently available transmission bandwidth has decreased.

13. The method of claim 10 comprising generating compressed data for the image using templates from different dictionaries to represent different sub-regions of the same image.

14. A method for compressing a digital image in a computing device, the method comprising:
  dividing a single image into sub-regions having a plurality of different sub-region sizes, the sub-region sizes being determined based on a bandwidth available for transmission when the sub-region image data is being compressed;
  dynamically altering the sub-region sizes when an indication is received that the currently available transmission bandwidth has changed;
  selecting from a dictionary one or more template patterns for each sub-region that most closely matches one or more image features of that sub-region and that has the same size as that sub-region; and
  generating a compressed data set for the image, in which each sub-region is represented by a code identifying the one or more template patterns selected therefor.

15. The method of claim 14 comprising switching to dividing the image into smaller sub-regions when an indication is received that the currently available transmission bandwidth has increased.

16. The method of claim 14 comprising switching to dividing the image into larger sub-regions when an indication is received that the currently available transmission bandwidth has decreased.

17. A system for compressing digital image data in a computing device, the method comprising:
  a processor configured for dividing an image into sub-regions;
  wherein said processor is configured for determining a maximum number of template codes for representing each sub-region, each template code uniquely identifying a template pattern in a dictionary including a plurality of predetermined template patterns, associating each of a plurality of the sub-regions with a plurality of template patterns, each of which individually does not match the sub-region, but which when combined together more closely match the sub-region, and generating a compressed data set for the image, in which each sub-region is represented by up to the maximum number of template codes uniquely identifying the associated plurality of template patterns; and
  a transmitter for transmitting for each sub-region the up to the maximum number of template codes from the compressed data set, wherein the maximum number of template codes is a dynamic parameter adjustable based on the bandwidth available for transmitting.

18. The system of claim 17 comprising a database storing the dictionary operatively coupled to the processor, wherein the processor is configured to search the dictionary for selecting the plurality of template patterns for each sub-region.

* * * * *